United States Patent [19]

Harvey et al.

[11] Patent Number: 4,554,021

[45] Date of Patent: Nov. 19, 1985

[54] PREPARATION OF A CATIONIC STARCH PASTE

[75] Inventors: Richard D. Harvey, Muscatine; E. Daniel Hubbard, West Liberty; Robert A. Meintrup, Muscatine, all of Iowa

[73] Assignee: Grain Processing Corporation, Muscatine, Iowa

[21] Appl. No.: 383,253

[22] Filed: May 28, 1982

Related U.S. Application Data

[63] Continuation-in-part of Ser. No. 121,401, Feb. 14, 1980, abandoned, which is a continuation-in-part of Ser. No. 893,510, Apr. 4, 1978, abandoned.

[30] Foreign Application Priority Data

Apr. 2, 1979 [ES] Spain ................................. 479.185

[51] Int. Cl.$^4$ ............................................. C08L 3/02
[52] U.S. Cl. ..................................... 106/213; 536/50
[58] Field of Search ................. 536/50; 106/210–213; 162/175

[56] References Cited

U.S. PATENT DOCUMENTS

| 2,876,217 | 3/1959 | Paschall | 536/50 |
|---|---|---|---|
| 2,917,506 | 12/1959 | Caldwell et al. | 536/50 |
| 2,995,513 | 8/1961 | Paschall et al. | 536/50 |
| 3,320,080 | 5/1967 | Mazzarella | 106/210 |
| 3,448,101 | 6/1969 | Billy et al. | 162/175 |
| 3,532,751 | 10/1970 | Langher et al. | 536/50 |
| 3,624,070 | 11/1971 | Hunt | 536/50 |
| 3,637,656 | 1/1972 | Germino et al. | 536/50 |
| 3,649,616 | 3/1972 | Goldstein et al. | 536/50 |
| 3,721,575 | 3/1973 | Jarowenko | 162/175 |
| 3,737,370 | 6/1973 | Jarowenko et al. | 536/50 |
| 3,842,005 | 10/1974 | Moser et al. | 536/50 |
| 3,930,877 | 1/1976 | Aitken | 106/273 |
| 4,029,885 | 6/1977 | Bulkema | 536/50 |
| 4,127,563 | 11/1978 | Rankin et al. | 536/50 |

FOREIGN PATENT DOCUMENTS

| 503573 | 1/1977 | Czechoslovakia . |
| 2055046 | 4/1972 | Fed. Rep. of Germany . |
| 1505243 | 3/1978 | United Kingdom . |

OTHER PUBLICATIONS

Sorenson & Campbell: Preparative Methods of Polymer Chem. Interscience: 1968, pp. 463, 369, and 462.
Roberts, et al., "Basic Principles of Organic Chem.", W. A. Benjamin, Inc. 1964, pp. 1106, 412.
Encyclopedia of Polymer Science Tech., Interscience Pub. 1967, vol. 6, pp. 109, 110, 151, 152, 154 & 213.
Skeist, Handbook of Adhesive, Runhold Pub., 1962 p. 324.

*Primary Examiner*—Theodore Morris
*Attorney, Agent, or Firm*—Neuman, Williams, Anderson & Olson

[57] ABSTRACT

A process for preparing a cationic starch dispersion wherein an alkaline, gelatinized starch is reacted with a cationic reagent either concurrently with, or subsequently to, the cooking process resulting in a product in which the cationic reagent is chemically bound to the starch molecule. The process is conducive to on-site preparation of a cationic starch derivative which can be utilized without additional treatment as a papermaking adjunct, textile size, waste-water treatment or tailings flocculent, etc.

19 Claims, No Drawings

PREPARATION OF A CATIONIC STARCH PASTE

This application is a continuation-in-part of Ser. No. 121,401 filed Feb. 14, 1980, which in turn is a continuation-in-part of Ser. No. 893,510 filed Apr. 4, 1978, both now abandoned.

This invention relates to the preparation of a cationic starch. More specifically, this invention relates to processes for the on-site preparation of cationic starch pastes for use in papermaking, textile size, waste water treatment, etc., without additional treatment.

Cationic starches are widely used as wet end additives in the papermaking process to improve fines and filler retention while increasing the strength characteristics of the resultant paper. A smaller, but no less important, papermaking application is in the size press and coating areas where cationic starches contribute to the strength and surface characteristics of the finished paper and, in addition, reduce the biological oxygen demand (BOD) contribution of the broke upon repulping.

Cationic starches are almost exclusively marketed as dry, granular, ungelatinized products. In use, the cationic starches must be reslurried in water and then gelatinized to produce a thoroughly dispersed cationic starch paste.

Granular cationic starches are generally prepared by reacting an alkaline (pH 11-12) starch slurry with a cationic reagent in the presence of a gelatinization inhibitor such as sodium chloride, sodium sulfate, etc. and at a temperature below the gelatinization temperature of the starch. Reaction times are characteristically 12 to 20 hours. Additional operations may be included in the process as required to obtain a product designed for a specific application. In any event, the reaction slurry must be adjusted to a more natural pH and then washed to remove the gelatinization inhibiting salts.

These basic procedures, though widely used, entail certain problems. Thus, granule state reactions in aqueous slurries require the addition of gelatinization inhibitors to prevent granule swelling. Because of the need to maintain the starch in granular form reaction temperatures must be low (less than 50° C.) to guard against gelatinization. Low reaction temperatures result in long, 12 hours or more, reaction times. The resultant highly alkaline reaction slurries must be neutralized prior to washing and drying and the added gelatinization inhibiting salts removed by washing. The washing operations, however, result in significant losses of both granular and the more highly derivatized, solubilized starch, contributing not only to reduced product yields but also to increased biological oxygen demand (BOD) and suspended solids loads in the waste water streams.

In addition, the variety of cationic starches commercially available suggests the products are intended for specific use areas and problems. Specialized starches of this type tend to be relatively low volume products and hence must command premium prices which further restrict their usage. This specialization creates inventory problems for the user due to the warehousing of a variety of different cationic starches to meet various requirements.

With the above problems in mind, the present invention is directed to a process whereby the ultimate user can on-site prepare a cationic starch to meet his specific needs from a single starch starting material.

The present invention provides a process in which:

(a) Only one relatively inexpensive starch is required to prepare a variety of cationic products, (b) No gelatinization inhibitor is required, (c) The reaction temperatures can be increased and as a result reaction times shortened as compared to granular state reactions, (d) Highly tailored products can be prepared at will on the use site eliminating the necessity of maintaining several different cationic starches in inventory, (e) The starch need not be neutralized, washed, or dried, minimizing losses, and (f) The resultant cationic starch is significantly less expensive than a corresponding granular preparation.

The novel process of this invention comprises:

1. Forming an aqueous starch paste, wherein the starch is present in a concentration of about 10 to 40% by weight, and 2. Treating the starch paste with a cationic reagent which is a monomeric halogenated alkyl or alkenyl amine, such as 2-diethylaminoethyl chloride hydrochloride (DEAE) and 4-chloro-2-butenyltrimethylammonium chloride (CBTC). A particularly preferred cationic reagent is the product obtained by reacting epichlorohydrin with trimethylamine or one of its salts, said reaction product being substantially free of residual epichlorohydrin and consisting substantially of 3-chloro-2-hydroxypropyltrimethylammonium chloride (CHPTA). The cationic reagent is employed in an amount to provide a starch derivative having a degree of substitution less than about 0.05 and preferably within the range of 0.005 to 0.03.

3. Further reacting said starch paste-cationic reagent combination with 1.5 to 8% of an alkali based on dry solids weight of starch at a temperature of 120° F. to 200° F., preferably 120° F. to 185° F., for a period sufficient to achieve a reaction efficiency of at least 40%.

A surprising discovery is that under these conditions of slurry solids, reaction times and reaction temperatures, the reaction efficiency is improved significantly when compared with the prior art. In addition to promoting the reaction, the alkali also aids in producing a highly dispersed starch paste, inhibits paste retrogradation, and facilitates handling of high solids starch pastes.

In accordance with one preferred embodiment of the present invention (Mode I), a high solids starch slurry is treated with cationic reagent in an amount to produce a derivative having a degree of substitution (D.S.) of 0.005 to 0.03 and continuously pumped to a suitable steam jet or other heating device and substantially simultaneously with gelatinization treated with alkali. Thus, an aqueous starch slurry containing from 10 to 40% starch dry solids is prepared and treated with the cationic reagent, for example, the epichlorohydrin-trimethylamine reaction product (the starch-reactive portion being 3-chloro-2-hydroxypropyltrimethylammonium chloride) in a manner to insure adequate mixing and in an amount to yield a cationic starch having a degree of substitution of less than 0.05. The starch slurry-cationic reagent mixture is then pumped to a suitable steam jet or other mixing device and substantially simultaneously treated with alkali sufficient to catalyze the reaction. Said alkaline starch slurry-cationic reagent combination is continuously and instantaneously gelatinized at 120° F. to 200° F. and held in a retention vessel for a period of time to insure a satisfactory reaction efficiency.

In accordance with a second preferred embodiment of the present invention (Mode II), a high solids starch slurry is thermal-chemically (T/C) converted or pasted and subsequently treated with alkali and the cationic reagent in an amount to produce a derivative having a degree of substitution of 0.005 to 0.03. Thus, a starch slurry containing from 10% to 40% starch, dry solids, is prepared. The starch slurry is cooked or gelatinized by any of many different methods, e.g. live steam injected into the slurry, external heat applied to the slurry, autoclaved, jet cooked, or thermal-chemically converted as described in U.S. Pat. No. 3,211,564. When the starch has been thoroughly dispersed, the paste is adjusted to temperatures between 120° F. and 200° F. This may be accomplished by the use of a heat exchanger, dilution water, or other suitable means. The alkali and the cationic reagent are then added to the paste. The order of addition can be inverted, but it is essential that each is added with thorough mixing. This mode is readily adaptable to the continuous production of cationic starch dispersions by incorporation of continuous stirred tank reaction principles.

The term dispersion is commonly used in the art and refers to an aqueous starch suspension which has been hydrated or gelatinized (sometimes referred to as pasted) by any of a number of means known to those skilled in the art.

Any of the commonly used starches can be used in carrying out this invention. Examples of suitable starches include corn, wheat, rice, tapioca, potato and sago starches as well as starches which have been premodified by various means such as acid modification, oxidation, derivatization and the like.

Alkali as used herein applies primarily to sodium hydroxide, however, other alkalies, such as potassium hydroxide, calcium hydroxide or oxide, sodium carbonate, trisodium phosphate, etc., can also be used.

The following examples illustrate the advantages of the invention. The cationic reagent employed in the following Examples I through XI was the preferred reagent obtained by reacting epichlorohydrin with trimethylamine or one of its salts, said reaction product being substantially free of residual epichlorohydrin and consisting substantially of 3-chloro-2-hydroxypropyltrimethylammonium chloride. The cationic reagents employed in the other specific examples were as indicated.

EXAMPLE I

An aqueous 23% dry solids starch slurry was prepared using unmodified corn starch. The slurry was then thermally-chemically converted using the following conditions:

| | |
|---|---|
| Ammonium Persulfate: | 0.03% d.s.b. (on starch dry solids basis) |
| Conversion Temperature: | Approximately 315° F. |
| Coil Pressure: | 80 psig |
| Retention Time: | Approximately 3 minutes. |

The resultant 20% dry solids paste was divided into three portions and cooled to: (1) 160° F., (2) 180° F., and (3) 200° F. Sodium hydroxide (4% on starch dry solids basis) and the cationic reagent, substantially 3-chloro-2-hydroxypropyltrimethylammonium chloride, were then added and the reaction allowed to continue for a total of 120 minutes. The cationic reagent was used in an amount of 4.5% based on starch on a dry solids basis. Periodically samples were taken and the unreacted reagent removed by precipitating the paste in and washing with methanol. The resulting wet cake was dried for Kjeldahl nitrogen analysis.

The degree of substitution (D.S.) is the average number of substituents per D-glucose unit.

The reaction efficiency was calculated as follows:

$$\text{Reaction efficiency (\%)} = \frac{D.S.}{\text{Mol ratio of the cationic reagent added}} (100\%).$$

TABLE I
EFFECT OF TEMPERATURE ON REACTION EFFICIENCY

| | Reaction Efficiency (%) at | | |
|---|---|---|---|
| Reaction Time | 160° F. | 180° F. | 200° F. |
| 5 minutes | 39.7 | 61.5 | 56.5 |
| 10 minutes | 53.5 | 62.1 | |
| 20 minutes | 62.3 | 67.7 | 65.9 |
| 40 minutes | 67.5 | 72.6 | 66.5 |
| 80 minutes | 68.6 | 73.6 | 65.0 |
| 120 minutes | 69.0 | 73.4 | 65.9 |

All samples were corrected for parent starch nitrogen content.

A 100% reaction efficiency is equivalent to a degree of substitution of 0.0388.

The results summarized in Table I demonstrate that the reaction efficiency is optimized at approximately 180° F., and the maximum reaction rate was obtained using a reaction temperature of 180° F.

EXAMPLE II

A starch slurry was thermally-chemically converted using conditions described in Example I. The resultant pastes were cooled to 180° F. and treated with 4.5% of the cationic reagent (on starch dry solids basis) with and without added alkali. Samples were removed after two hours and prepared for assay as described in Example I.

The results (Table II) show that without added alkali there was little if any reaction; however, in the presence of 3% added sodium hydroxide (on starch dry solids basis) the reaction efficiency was approximately 75%. Reaction efficiencies of this magnitude are approximately several times that calculated for the so-called "paste state" reactions described in the prior art.

TABLE II

| Test No. | Cationic Reagent (% on starch d.s.b.) | NaOH (% on starch d.s.b.) | Degree of Substitution | Reaction Efficiency % |
|---|---|---|---|---|
| 1 | 0 | 0 | 0 | 0 |
| 3 | 4.5 | 0 | 0.0019 | 5 |
| 4 | 4.5 | 3 | 0.0291 | 75 |

EXAMPLE III

A starch slurry was thermally-chemically converted using conditions described in Example I. The resultant pastes were cooled to 180° F. and treated with 4.5% of the cationic reagent (on starch dry solids basis) using 3%, 4% or 5% sodium hydroxide (on starch dry solids). Samples were withdrawn periodically and worked up as described in Example I.

TABLE III

Effect of Sodium Hydroxide Usage on the
Reaction Efficiency and the Reaction Rate

| | Reaction Efficiency (%) at (%) NaOH (Starch d.s.b.) | | |
|---|---|---|---|
| Reaction Time | 3% | 4% | 5% |
| 5 minutes | 45.3 | 61.5 | 58.1 |
| 10 minutes | 52.7 | 62.1 | — |
| 20 minutes | 66.6 | 67.7 | 65.9 |
| 40 minutes | 68.7 | 72.6 | 69.0 |
| 80 minutes | 71.0 | 73.6 | 69.2 |
| 120 minutes | 71.4 | 73.4 | 70.9 |

All samples corrected for parent starch nitrogen content.

A 100% reaction efficiency is equivalent to a D.S. of 0.0388.

The results summarized above show that the reaction efficiency and the reaction rate were maximized at a 4% alkali usage (dry solids basis).

EXAMPLE IV

A thermally-chemically converted starch paste was prepared as described in Example I and then diluted to 3%, 5% and 10% dry solids using hot water. The resultant low solids pastes, as well as the starting high solids paste, were agitated and cooled to and maintained at 180° F. in a water bath. The various pastes were then treated with: (1) the cationic reagent (4.5% on starch dry solids basis), and (2) sodium hydroxide (3% on starch dry solids basis). After two hours at 180° F., the samples were prepared for assay as described in Example I.

The results, summarized in Table IV, show that the reaction efficiency is directly related to the dry solids level at which the reaction was conducted. The relatively low reaction temperatures and low reaction times in combination with the high reaction solids account for the high reaction efficiencies when compared to the prior art.

TABLE IV

The Effect of the Starch Paste Concentration on Reaction Efficiency

| Sample No. | Starch Paste d.s. (%) | Cationic Reagent (% on starch d.s.b.) | NaOH (% on starch d.s.b.) | Degree of Substitution | Reaction Efficiency % |
|---|---|---|---|---|---|
| 1 | 20 | 0 | 0 | 0 | 0 |
| 2 | 3 | 4.5 | 3 | 0.0019 | 5.0 |
| 3 | 5 | 4.5 | 3 | 0.0090 | 23.3 |
| 4 | 10 | 4.5 | 3 | 0.0187 | 48.1 |
| 5 | 20 | 4.5 | 3 | 0.0278 | 71.7 |

EXAMPLE V

An aqueous 15% solids slurry was prepared using unmodified corn starch and continuously thermally-chemically converted using the following conditions:

| | |
|---|---|
| Cationic Reagent: | 5% on starch dry solids basis. |
| Sodium Hydroxide: | 4% on starch dry solids basis added, as a solution, just upstream from the stream jet. |
| Conversion Temperatures: | 175° F., 225° F. and 300° F. |
| Reaction Time: | Approximately 16–18 minutes. |

The resultant starch pastes were immediately neutralized to pH 5–7, thereby terminating the reaction, and then precipitated in and washed with methanol to remove the soluble nitrogen containing material. The resultant wet cake was dried for Kjeldahl nitrogen analysis.

The results, summarized in Table V, show that at constant sodium hydroxide usage and at a fixed reaction time efficiencies decreased as the reaction temperature increased from 175° F. to 225° F. to 300° F.

TABLE V

| Test No. | Reaction Temperatures °F. | D.S. | Reaction Efficiency (%) |
|---|---|---|---|
| 1 | 175 | 0.0178 | 41 |
| 2 | 225 | 0.0101 | 23 |
| 3 | 300 | 0.0061 | 14 |

EXAMPLE VI

Cationic starch pastes were prepared by continuously thermally-chemically converting a 15% dry solids slurry of unmodified corn starch using the following conditions:

| | |
|---|---|
| Cationic Reagent: | 5% on starch dry solids basis. |
| Sodium Hydroxide Usage: | 2, 4 or 6% on starch dry solids basis added, as an aqueous solution, just upstream from the jet. |
| Conversion Temperature: | Approximately 175° F. |
| Reaction Time: | approximately 16 minutes. |

The resultant cationic starch pastes were prepared for assay as described in Example V.

Under these conditions, the reaction efficiency (Table VI-A) increases with increasing alkali usage:

TABLE VI-A

Effect of Sodium Hydroxide Usage on
Reaction Efficiency in Low Solids T/C Conversions

| Test No. | NaOH (% on starch d.s.b.) | Degree of Substitution | Reaction Efficiency % |
|---|---|---|---|
| 1 | 2 | 0.0064 | 15 |
| 2 | 4 | 0.0143 | 33 |
| 3 | 6 | 0.0193 | 45 |

The above experiment was repeated except:
1. The slurry was prepared at 30% dry solids using a 25 Buel fluidity acid-modified starch, and
2. The reaction temperature was increased to 200° F.

Under these high solids, thermal-chemical conversion conditions, the reaction efficiency (Table VI-B) was maximized at approximately a 4% NaOH use level (on starch dry solids basis).

TABLE VI-B

Effect of Sodium Hydroxide Usage on Reaction
Efficiency in High Solids T/C Conversions

| Test No. | NaOH (% on starch d.s.b.) | Degree of Substitution | Reaction Efficiency % |
|---|---|---|---|
| 1 | 2 | 0.0230 | 54 |
| 2 | 4 | 0.0253 | 59 |
| 3 | 5 | 0.0240 | 56 |

EXAMPLE VII

An aqueous corn starch slurry was thermally-chemically converted using the following conditions:

| | |
|---|---|
| Slurry: | 15% and 30% dry solids using unmodified corn starch and a 25 Buel acid modified starch, respectively. |
| Cationic Reagent: | 5% on starch dry solids basis. |
| Sodium Hydroxide: | 2% on starch dry solids basis. |
| Conversion Temperature: | Approximately 175° F. |
| Reaction Time: | Approximately 16 minutes. |

The resultant pastes were prepared for assay using the procedures described in Example V.

The results, summarized in the following table, show that the reaction efficiency is directly related to the reaction solids level.

TABLE VII

The Effect of the Starch Paste Concentration on the Reaction Efficiency

| Test No. | Starch (d.s., %) | Degree of Substitution | Reaction Efficiency % |
|---|---|---|---|
| 1 | 15 | 0.0178 | 41 |
| 2 | 30 | 0.0230 | 54 |

EXAMPLE VIII

An aqueous 15% starch slurry was thermally-chemically converted using conditions described in Example V except:

1. The sodium hydroxide usage was 2–3% (on starch dry solids basis), and
2. The reaction times were approximately 2.5, 10 and 16 minutes.

The resultant pastes were prepared for assay using procedures described in Example V.

TABLE VIII

The Effect of Reaction Time on the Reaction Efficiency

| Test No. | Reaction Time (Minutes) | Degree of Substitution | Reaction Efficiency % |
|---|---|---|---|
| 1 | 2.5 | 0.0038 | 9 |
| 2 | 10 | 0.0064 | 15 |
| 3 | 16 | 0.0178 | 41 |

The results, summarized in Table VIII, show that in only 16 minutes reaction efficiencies were greater than prior art "paste state" reactions.

EXAMPLE IX

Starch pastes were prepared as described in Example II, samples #3 and #4, i.e. reacted with 4.5% active cationic reagent on starch dry solids basis with and without added alkali. The resultant alkaline cationic pastes were diluted to 1% dry solids and added to the furnish at the rate of 20 pounds starch, dry solids basis, per ton of pulp.

Handsheets were prepared using the Noble and Wood Handsheet Apparatus. Stock furnish was as follows:

| | |
|---|---|
| 75% Hardwood Bleached Kraft | |
| 25% Softwood Bleached Kraft | |
| Canadian Standard Freeness | 400 ± 25 mls. |
| Titanium dioxide | 2.4% on pulp d.s. |
| Clay | 9.6% on pulp d.s. |
| Rosin | 1.0% on pulp d.s. |
| Alum | 2.5% on pulp d.s. |

The resultant sheets were conditioned and tested according to the following TAPPI standard procedures:

| | TAPPI Standard Procedure |
|---|---|
| Conditioning | T402 |
| Ash | T413 |
| Tensile | T404 |
| Mullen (Burst) | T403 |

Scott Bond values were determined using the manufacturer's recommended procedure.

Filler retention was calculated using the following formula:

$$\text{Filler Retention (\%)} = \frac{\% \text{ Ash (dry solids basis) in sheet}}{\% \text{ Ash in Furnish}} \times 100$$

The burst factor was calculated as follows:

$$\text{Burst Factor} = \frac{\text{Mullen (g/m}^2\text{)}}{\text{Basis wt. (g/m}^2\text{)}}$$

TABLE IX

The Effect of a Derivatized Cationic Starch on Handsheet Characteristics

| | Starch | | | Paper | | | |
|---|---|---|---|---|---|---|---|
| Test No. | Cationic Reagent (% on starch d.s.b.) | NaOH (% on starch d.s.b.) | Degree of Substitution | Filler Retention (%) | Tensile lb/in | Burst Factor | Scott Bond |
| 1 | 0 | 0 | 0 | 29.6 | 13.4 | 18,3 | 67.9 |
| 2 | 4.5 | 0 | 0.0040 | 31.0 | 15.0 | 17.7 | 69.2 |
| 3 | 4.5 | 3 | 0.0280 | 55.6 | 14.2 | 17.0 | 70.7 |

The results summarized in Table IX show that alkali is required to obtain a reasonable reaction efficiency. The results also show that the more highly derivatized cationic starch not only retains more ash in the sheet but also maintains the sheet strength characteristics at a high level in spite of the increased filler loading.

The results demonstrate that the presence of unreacted cationic reagent is not sufficient to improve functional characteristics of the starch, whereas starch which has been reacted with the cationic reagent significantly improves performance.

EXAMPLE X

The furnish as described in Example IX was used to prepare additional handsheets.

Various starches were incorporated into the furnish to compare performance. Sets #2 and #3 include a thermally-chemically converted corn starch prepared as described in Example I. The starch used in Set #2 had not been reacted with cationic reagent whereas starch used in Set #3 had, as is indicated.

Starch used in Set #4 had been reacted simultaneously with thermal conversion as is described in Example V.

Starches used in Sets #5 and #6 are commercially prepared granular cationic products.

The results of testing those handsheets as shown in the following table demonstrate the functional characteristics of products prepared by either on-site method.

Significant increases are noted in filler retention and strength with cationic starch products, while a reduction in filler retention is noted with the untreated starch product.

TABLE X

| Set Number | Starch Preparation | | Nitrogen Degree of Substitution | Starch on pulp #/ton | Filler Retention | Scott Bond | Bursting Factor |
|---|---|---|---|---|---|---|---|
| | CHPTA % d.s.b. | NaOH % d.s.b. | | | | | |
| 1 | — | — | — | None | 35.1 | 55.7 | 14.7 |
| 2 | 0 | 0 | 0.005[a] | 10 | 29.5 | 65.9 | 18.4 |
| 3* | 4.5 | 3 | 0.028[b] | 10 | 51.3 | 63.5 | 16.3 |
| 4** | 5 | 4 | 0.028[b] | 10 | 54.6 | 90.2 | 17.4 |
| 5[c] | | | 0.022[b] | 10 | 54.1 | 71.25 | 18.2 |
| 6[d] | | | 0.032[b] | 10 | 65.6 | 69.3 | 14.6 |

[a]represents nitrogen in parent starch.
[b]corrected for parent nitrogen.
[c]Cato 1570 - A cationic starch produced by National Starch and Chemical Co.
[d]Cato 15 - A cationic starch produced by National Starch and Chemical Co.
*Mode I
**Mode II

EXAMPLE XI

Handsheets were prepared using the Noble and Wood Handsheet Apparatus. The stock was a commercial furnish obtained from a manufacturer of fine papers. Fiber included hardwood and softwood kraft, and broke.

Starches used in Sets #2, #3 and #4 were prepared after thermal-chemically converting as is described in Example I. Starch used in Set #2 had not been treated with the cationic reagent. Starch used in Set #3 had been treated and reacted with the cationic reagent and sodium hydroxide. Starch used in Set #4 was treated with the cationic reagent but no sodium hydroxide.

The results demonstrate that the presence of the cationic reagent is not sufficient to improve the functional characteristics of the starch, whereas starch which has been reacted (Set #3) is comparable in performance to commercially prepared granular cationic starches (Sets #5 and #6) as is illustrated by increased ash content and improved strength properties.

TABLE IX

| Set Number | Starch Preparation | | Nitrogen Degree of Substitution | Starch on pulp #/ton | % Ash in Sheet | Scott Bond | Bursting Factor |
|---|---|---|---|---|---|---|---|
| | Cationic Reagent % d.s.b. | NaOH % d.s.b. | | | | | |
| 1 | — | — | — | None | 3.45 | 40.7 | 16.7 |
| 2 | 0 | 0 | 0.005[a] | 20 | 3.32 | 42.3 | 15.6 |
| 3 | 4.5 | 3 | 0.022[b] | 20 | 4.48 | 58.2 | 17.6 |
| 4 | 4.5 | 0 | 0.004[b] | 20 | 3.13 | 48.5 | 17.1 |
| 5[c] | | — | 0.022[b] | 20 | 4.86 | 56.0 | 17.9 |
| 6[d] | | — | 0.032[b] | 20 | 4.17 | 53.3 | 17.5 |

[a]represents parent starch nitrogen.
[b]corrected for parent starch nitrogen.
[c]Cato 1570
[d]Cato 15

EXAMPLE XII

An aqueous, 23% dry solids, starch slurry was prepared using unmodified corn starch. The slurry was thermal-chemically (T/C) converted using the following conditions.

| | |
|---|---|
| Ammonium Persulfate (AP): | 0.03% on starch dry solids basis |
| Conversion Temperature: | approximately 315° F. |
| Coil Pressure: | approximately 80 psig |
| Retention Time: | approximately 5 minutes |

The resultant paste was divided into portions and cooled to 120°, 140°, 160°, 180° and 200° F. (49°, 60°, 71°, 82° and 93° C., respectively). Sodium hydroxide and a cationic reagent in the amounts indicated in Table XII were added and the reaction allowed to continue for 45 minutes. The resultant starch pastes were prepared for assay as described in Example V.

The results, summarized in Table XII, show that the efficiency for the starch—(1) DEAE reaction decreases as the reaction temperature increases from 120°–200° F. and (2) CHPTA and CBTC reactions are maximized at a reaction temperature of 160°–170° F. The use of higher reaction temperatures results in a significant loss in reaction efficiency.

TABLE XII

| | | | Reagent Additions | | | Reaction Data | |
|---|---|---|---|---|---|---|---|
| Sample | Paste Dry Solids (%) | Reaction Temp. (°F.) | NaOH % on Starch d.s.b. | Cationic Reagent | | D.S. | Reaction Eff. (%) |
| | | | | Type | % on starch d.s.b. | | |
| 1 | 18.06 | 120° | 4.44 | DEAE | 5.07 | 0.0415 | 87 |
| 2 | 18.06 | 140° | 4.44 | " | 5.07 | 0.0388 | 81 |
| 3 | 18.38 | 160° | 4.36 | " | 4.99 | 0.0359 | 76 |
| 4 | 17.98 | 180° | 4.46 | " | 5.10 | 0.0370 | 77 |
| 5 | 18.38 | 200° | 4.36 | " | 4.99 | 0.0354 | 75 |

TABLE XII-continued

| Sample | Paste Dry Solids (%) | Reaction Temp. (°F.) | NaOH % on Starch d.s.b. | Cationic Reagent Type | Cationic Reagent % on starch d.s.b. | D.S. | Reaction Eff. (%) |
|---|---|---|---|---|---|---|---|
| 6 | 18.06 | 120° | 4.44 | CBTC | 5.36 | 0.0206 | 44 |
| 7 | 18.06 | 140° | 4.44 | " | 5.36 | 0.0290 | 61 |
| 8 | 17.81 | 160° | 4.50 | " | 5.43 | 0.0338 | 71 |
| 9 | 17.81 | 180° | 4.50 | " | 5.43 | 0.0329 | 69 |
| 10 | 17.81 | 200° | 4.50 | " | 5.43 | 0.0286 | 60 |
| 11 | 18.06 | 120° | 4.44 | CHPTA | 4.95 | 0.0193 | 45 |
| 12 | 18.06 | 140° | 4.44 | " | 4.95 | 0.0280 | 65 |
| 13 | 18.38 | 160° | 4.36 | " | 4.90 | 0.0288 | 68 |
| 14 | 17.98 | 180° | 4.46 | " | 5.00 | 0.0293 | 68 |
| 15 | 17.98 | 200° | 4.46 | " | 5.00 | 0.0273 | 64 |

EXAMPLE XIII

An aqueous, 15% dry solids, starch slurry was prepared using acid-modified corn starch and then thermal-chemically converted using the conditions described below:

| | |
|---|---|
| Cationic Reagent: | Added batchwise to the slurry. |
| Sodium Hydroxide: | Added continuously as a solution, just upstream from the steam jet. |
| Conversion Temperatures: | °F.    °C. |
| | 150    66 |
| | 175    79 |
| | 225    107 |
| | 300    149 |
| Reaction Time: | 14–16 minutes |

The resultant starch pastes were prepared for assay as described in Example V.

The results, summarized in Table XIII, show that the efficiency for the starch—(1) DEAE reaction decreases as the reaction temperature increases from 150° up to 300° F. and (2) CBTC reaction is maximized at a temperature of about 175° F. The use of lower or higher reaction temperatures (especially the latter) would result in a significant loss in reaction efficiency.

TABLE XIII

| Sample No. | Slurry Dry Solids (%) | Reaction Temp. (°F.) | Reaction Time (min) | NaOH % on Starch d.s.b. | Cationic Reagent Type | Cationic Reagent % on Starch d.s.b. | D.S. | Reaction Eff. (%) |
|---|---|---|---|---|---|---|---|---|
| 1 | 15.68 | 300° | 14–16 | 4.22 | DEAE | 4.58 | 0.0164 | 38 |
| 2 | " | 225° | " | " | " | " | 0.0226 | 52 |
| 3 | " | 175° | " | " | " | " | 0.0272 | 63 |
| 4 | " | 150° | " | " | " | " | 0.0280 | 65 |
| 5 | 14.53 | 300° | 14–16 | 4.07 | CBTC | 4.90 | 0.0044 | 10 |
| 6 | " | 225° | " | " | " | " | 0.0142 | 33 |
| 7 | " | 175° | " | " | " | " | 0.0189 | 44 |
| 8 | " | 150° | " | " | " | " | 0.0132 | 31 |

The process of this invention eliminates the need to prepare granular cationic starches which require incorporation of swelling inhibitors and generate high biological oxygen demands in waste water effluents. The process offers reaction efficiencies that are appreciably higher than any known pasted state efficiency and significantly better than any known granular state efficiency and permits adjustment of reaction conditions to suit specific needs ranging from low dry solids, high fluidity, size press starches to high dry solids, low fluidity wet end starches. The process makes it possible for an end user to prepare on-site cationic starches from a basic starch without maintaining a large inventory of special starches.

Those modifications and equivalents which fall within the spirit of the invention are to be considered a part thereof.

What is claimed is:

1. A process for preparing cationic starch pastes comprising:
   a. preparing an aqueous starch paste having a solids level in the range from about 10% to 40% by weight,
   b. treating said starch paste with a cationic monomeric halogenated alkyl or alkenyl amine, said cationic monomeric halogenated alkyl or alkenyl amine being used in an amount to provide a starch derivative having a degree of substitution less than about 0.05,
   c. reacting said treated starch with an amount of an alkali in the range of 1.5 to 8% based on dry solids weight of starch at a temperature of 120° F. to 200° F., wherein the solids level of the starch paste, the amount of alkali and the temperature and period of reaction are adjusted to achieve a reaction efficiency of at least about 40%.

2. A process according to claim 1 in which there is employed a cationic monomeric halogenated alkyl amine obtained by reacting epichlorohydrin with trimethylamine or a salt thereof, said reaction product being substantially free of residual epichlorohydrin and consisting substantially of 3-chloro-2-hydroxypropyl-trimethylammonium chloride.

3. A process according to claim 1 in which 2-diethylaminoethyl chloride hydrochloride is employed.

4. A process according to claim 1 in which 4-chloro-2-butenyltrimethylammonium chloride is employed.

5. A process according to claim 1 in which the starch paste is prepared on a continuous basis in a thermal or thermal-chemical converter under superatmospheric conditions.

6. A process according to claim 1 in which said cationic monomeric halogenated alkyl or alkenyl amine is employed in Step (b) in an amount to provide a starch derivative having a degree of substitution of from about 0.005 to 0.03.

7. A process according to claim 1 in which Step (c) is carried out at a temperature of from 120° F. to 185° F.

8. A process for preparing cationic starch pastes, comprising:
   a. preparing an aqueous starch slurry containing from about 10% to 40% dry solids,
   b. treating said starch slurry with a cationic monomeric halogenated alkyl or alkenyl amine, said cationic monomeric halogenated alkyl or alkenyl amine being used in an amount to provide a starch derivative having a degree of substitution less than about 0.05, and
   c. heating said starch-cationic reagent mixture to gelatinize the starch and substantially simultaneously with the gelatinization reacting with the starch-cationic reagent mixture an amount of alkali in the range of 1.5 to 8% based on dry solids weight of starch at a temperature of from 120° F. to 200° F., wherein the solids level of the starch paste, the amount of alkali and the temperature and period of reaction are adjusted to achieve a reaction efficiency of at least about 40%.

9. A process according to claim 8 in which there is employed a cationic monomeric halogenated alkyl amine obtained by reacting epichlorohydrin with trimethylamine or a salt thereof, said reaction product being substantially free of residual epichlorohydrin and consisting substantially of 3-chloro-2-hydroxypropyl-trimethylammonium chloride.

10. A process according to claim 8 in which 2-diethylaminoethyl chloride hydrochloride is employed.

11. A process according to claim 8 in which 4-chloro-2-butenyltrimethylammonium chloride is employed.

12. A process according to claim 8 in which said cationic monomeric halogenated alkyl or alkenyl amine is employed in Step (b) in an amount to provide a starch derivative having a degree of substitution of from about 0.005 to 0.03.

13. A process according to claim 8 in which Step (c) is carried out at a temperature of from 120° F. to 185° F.

14. A process for preparing cationic starch pastes, comprising:
   a. preparing an aqueous starch slurry having a solids level of from about 10% to 40% by weight,
   b. gelatinizing the starch slurry at a temperature of from 150° F. to 350° F.
   c. treating said starch paste with a cationic monomeric halogenated alkyl or alkenyl amine, said amine being used in an amount to provide a starch derivative having a degree of substitution less than 0.05,
   d. reacting with the starch-cationic reagent mixture an amount of alkali in the range of 1.5 to 8% based on dry solids weight of starch at a temperature of from 120° F. to 200° F., wherein the solids level of the starch paste, the amount of alkali and the temperature and period of reaction are adjusted to achieve a reaction efficiency of at least about 40%.

15. A process according to claim 14 in which said cationic monomeric halogenated alkyl or alkenyl amine is employed in Step (c) in an amount to provide a starch derivative having a degree of substitution of from about 0.005 to 0.03.

16. A process according to claim 14 in which Step (d) is carried out at a temperature of from 120° F. to 185° F.

17. A process according to claim 14 in which there is employed a cationic monomeric halogenated alkyl amine obtained by reacting epichlorohydrin with trimethylamine or a salt thereof, said reaction product being substantially free of residual epichlorohydrin and consisting substantially of 3-chloro-2-hydroxypropyl-trimethylammonium chloride.

18. A process according to claim 14 in which 2-diethylaminoethyl chloride hydrochloride is employed.

19. A process according to claim 15 in which 4-chloro-2-butenyltrimethylammonium chloride is employed.

* * * * *